United States Patent
Dresher et al.

(10) Patent No.: US 7,848,511 B2
(45) Date of Patent: Dec. 7, 2010

(54) TELECOMMUNICATIONS-TERMINAL MUTE DETECTION

(75) Inventors: Kevin Dresher, Tinton Falls, NJ (US); Emil F. Stefanacci, Freehold, NJ (US); Thomas Anthony Petsche, Neshanic Station, NJ (US); Bina Patel, Sabarkantha (IN)

(73) Assignee: Avaya Inc., Basking Ridge, NJ (US)

( * ) Notice: Subject to any disclaimer, the term of this patent is extended or adjusted under 35 U.S.C. 154(b) by 157 days.

(21) Appl. No.: 12/241,965

(22) Filed: Sep. 30, 2008

(65) Prior Publication Data

US 2010/0080382 A1   Apr. 1, 2010

(51) Int. Cl.
*H04M 1/00* (2006.01)
*H04M 9/00* (2006.01)

(52) U.S. Cl. .................. 379/421; 379/433.03

(58) Field of Classification Search .......... 381/95.5, 381/122, 104, 107, 111; 379/421, 388.02, 379/388.03, 420.03, 202.01; 455/174.1
See application file for complete search history.

(56) References Cited

U.S. PATENT DOCUMENTS

2006/0280295 A1*  12/2006  Runcie .............. 379/88.26

* cited by examiner

*Primary Examiner*—Tuan D Nguyen
(74) *Attorney, Agent, or Firm*—DeMont & Breyer, LLC

(57) ABSTRACT

The subject matter provides a method that enable detecting if a party engaged into a tele-conference call is attempting to engage into conversation while a microphone is in a mute mode. The method provides receiving of a signal. The signal is then analyzed to determining if a party is attempting to engage into conversation. If it is determined that the party is attempting to engage in the conversation then an alarm is transmitted indicating the mode of operation of the microphone. The transmitted alarm may be an audio alert or a visual alert.

11 Claims, 2 Drawing Sheets

Telecommunications System 100

TELECOMMUNICATIONS-TERMINAL MUTE DETECTION

FIELD OF THE INVENTION

The present invention relates to telecommunications in general, and, more particularly, to detecting the mute status of a microphone.

BACKGROUND OF THE INVENTION

When people are engaged in a conference call, it is common for the people at one end of the call to mute the microphone. But the manual muting and un-muting of the microphone has disadvantages, and, therefore, the need exists for improvements in muting and un-muting a microphone.

SUMMARY OF THE INVENTION

The present invention enables a telecommunications system to afford a muting function without some of the costs and disadvantages for doing so in the prior art. For example, the illustrative embodiment detects when a user is speaking into a microphone that is muted, and, therefore, alerts the user to the fact and automatically un-mutes the microphone.

The illustrative embodiment detects that the user is speaking into the microphone in two ways. First, the illustrative embodiment comprises a proximity sensor which detects the proximity of the user to the microphone. Second, the illustrative embodiment analyzes the user's voice and, based on the user's intonation, infers that the user is speaking into the microphone and not merely to another person in his or her vicinity. In this way, the illustrative embodiment provides a muting function that avoids some of the costs and disadvantages with muting functions in the prior art.

The illustrative embodiment comprises: receiving a speech signal of a user of a microphone; and transmitting an alarm when: (i) the microphone is muted, and (ii) the intonation of the speech signal indicates that the user is speaking into the microphone.

DETAILED DESCRIPTION

Figure 1:
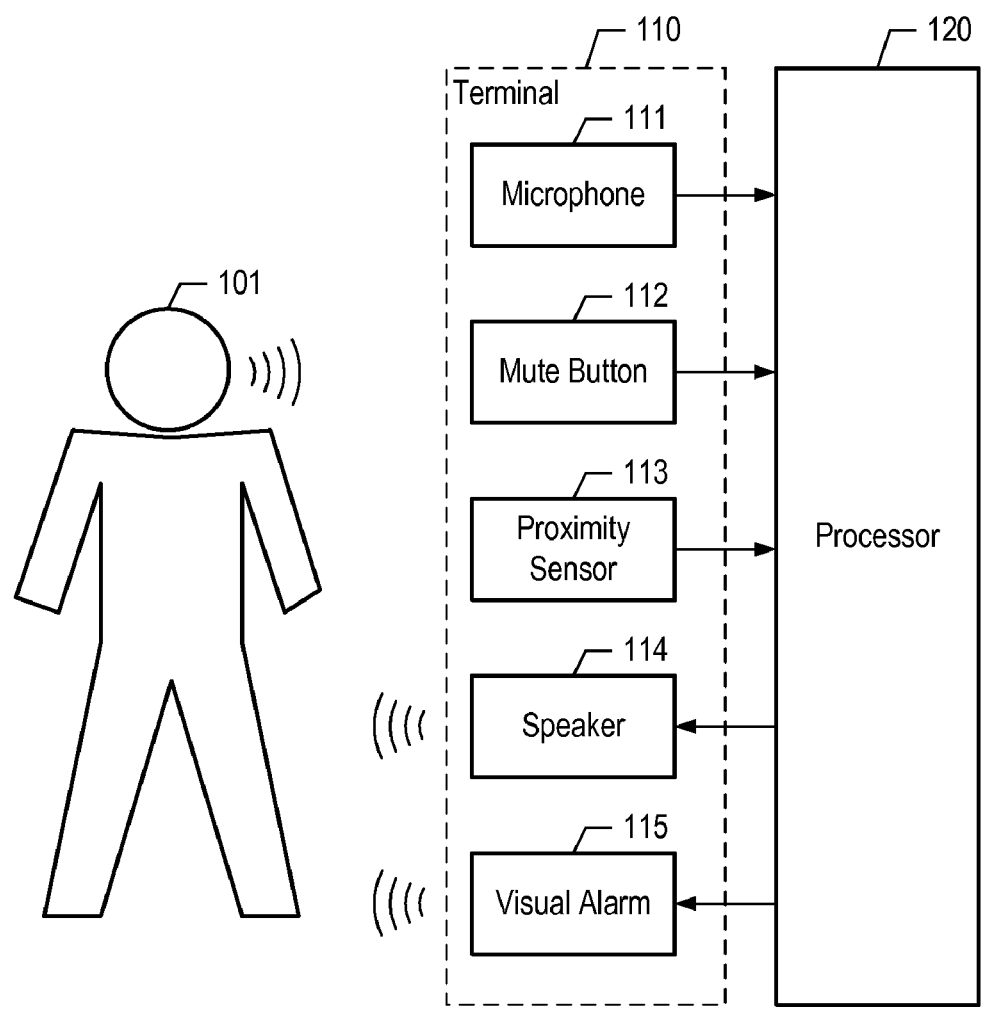
FIG. 1 depicts a schematic diagram of the salient portion of telecommunications system 100 in accordance with the illustrative embodiment.

FIG. 1 depicts a schematic diagram of the salient portion of telecommunications system 100 in accordance with the illustrative embodiment. Telecommunications system 100 comprises: user 101, telecommunications terminal 110, and processor 120, interconnected as shown.

Telecommunications terminal 110 comprises: microphone 111, mute button 112, proximity sensor 114, speaker 114, and visual alarm 115. In accordance with the illustrative embodiment, microphone 111, mute button 112, and proximity sensor 113 have a distinct connection with processor 120, but it will be clear to those skilled in the art, after reading this disclosure, how to make and use alternative embodiments of the present invention in which microphone 111, mute button 112, and proximity sensor 113 share a single connection. In accordance with the illustrative embodiment, processor 120 has a distinct connection with speaker 114 and visual alarm 115, but it will be clear to those skilled in the art, after reading this disclosure, how to make and use alternative embodiments of the present invention in which speaker 114 and visual alarm share a single connection.

Microphone 111 is an electro-acoustic transducer that receives an acoustic speech signal from user 101 and converts it into an electrical signal for processor 120. In accordance with the illustrative embodiment, microphone 111 converts acoustic signals into electrical signals for processor 120 when microphone 111 is both muted and when it is not muted. It will be clear to those skilled in the art how to make microphone 111.

Mute Button 112 is hardware for enabling user 101 to mute microphone 111. It will be clear to those skilled in the art how to make and use mute button 112.

Proximity sensor 114 is an infra-red sensor that is designed to detect the body heat of user 101 when user 101 is speaking into microphone 111 and to transmit a proximity signal indicating such to processor 120. It will be clear to those skilled in the art, after reading this disclosure, how to make and use alternative embodiments of the present invention in which proximity sensor 113 uses one or a combination of technologies for detecting when user 101 is speaking into microphone 111. For example and without limitation, microphone 111 can also use ultra-sonics, acoustics, radio, etc. to detect when user 101 is speaking into microphone 111. It will be clear to those skilled in the art how to make and use proximity sensor 113.

Speaker 114 is an electro-acoustic transducer for outputting sound and audible alarms from processor. It will be clear to those skilled in the art how to make and use speaker 114.

Visual alarm 115 is hardware for alerting user 101 to the fact that user 101 is speaking into microphone 111 when microphone 111 is muted. It will be clear to those skilled in the art how to make and use visual alarm 115.

Processor 120 is hardware and software for processing the signals from microphone 111, proximity sensor 113 and for producing the signals for speaker 114 and visual alarm 115 as described below with respect to FIG. 2.

Figure 2:
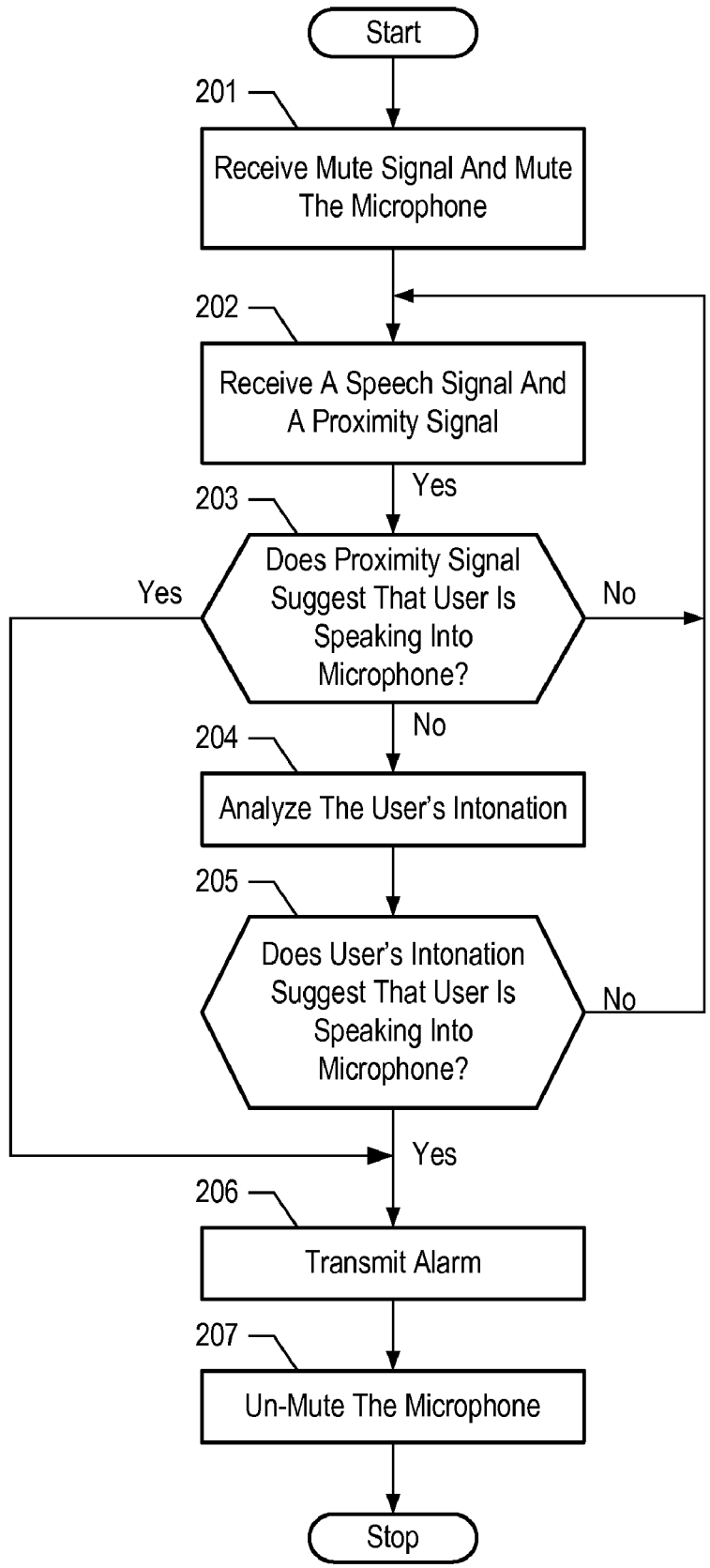
FIG. 2 depicts a flowchart of the salient tasks performed in accordance with the illustrative embodiment.

FIG. 2 depicts a flowchart of the salient tasks performed in accordance with the illustrative embodiment.

At task 201, processor 120 receives a mute signal from mute button 112 and mutes microphone 111.

At task 202, processor 120 receives a speech signal from microphone 111 or a proximity signal from proximity sensor 113 or a combination both the speech signal and the proximity signal.

At task 203, processor 120 determines if the proximity signal from proximity sensor 113 suggests that user 101 is speaking into microphone 111. If the answer is yes, then control passes to task 206; otherwise control returns to task 204. In an embodiment, proximity of user 101 may be determined by examining the speech signal. The inventors of this subject matter have determined that speech characteristics of the speech signal vary subject to proximity of user 101 from microphone 111. For example, prosody of the speech signal change with proximity of user 101 and microphone 111, by examining changes in prosody, proximity of user 101 may be determined. If the proximity obtained from such examination suggests that the user is speaking into microphone 111, then the control passes to task 206; otherwise control returns to task 204.

At task 204, processor 120 analyzes the speech signal to assess user 101's intonation. The inventors of this subject matter have also recognized that in addition to determine proximity of user 101 and microphone 111, speech characteristics of the speech signal may also be used to further confirm whether user 101 is speaking into microphone 111. In an embodiment the speech signal may be analyzed to extract a level of intonation or a text string or both from the speech signal. In another embodiment, a voice activity detector is employed in processor 120. The voice activity detector monitors energy levels of the speech signal and background noise.

In a further embodiment, the speech signal is analyzed against user 101's acoustic and vocal patterns received during an un-muted mode of microphone 111. For practicing this embodiment, processor 120 is configured to receive samples of acoustic and vocal patterns during un-muted mode of microphone 111 and generate a voice print according to the samples. The speech signal may be analyzed against the voice print.

At task 205, processor 120 determines whether the user 101's intonation suggests that user 101 is speaking into microphone 111. By comparing the level of intonation with a predetermined threshold processor 120 determines if user 101 is speaking into microphone 111. In an embodiment, processor 120 examines the text string to determine if user 101 is speaking into microphone 111. An example of the text string may include "can you hear me" or "are you there", etc. In another embodiment the voice activity detector determines whether user 101 is speaking in microphone 111 by comparing the energy levels of the speech signal and background noise against a threshold energy level. In a further embodiment, results from the analysis of the voice print and the speech signal are used for determining if user 101 is speaking into microphone 111. If processor 120 at task 204 determines that user 101 is speaking into microphone 111 then, control passes to task 206; otherwise control returns to task 201.

At task 206, processor 120 transmits (i) an alarm signal to speaker 114 and visual alarm 115 alerting user 101 to the fact that microphone 111 is muted.

At task 207, processor 120 un-mutes microphone 111.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
receiving a speech signal of a user of a microphone and transmitting an alarm when:
 (i) the microphone is muted, and
 (ii) the intonation of the speech signal indicates that the user is speaking into the microphone.

2. The method of claim 1 wherein the alarm is audible.

3. The method of claim 1 wherein the alarm is visual.

4. The method of claim 1 further comprising un-muting the microphone.

5. The method of claim 1 further comprising receiving a proximity signal from a proximity sensor associated with the microphone.

6. The method of claim 1 wherein the alarm is transmitted when:
 (i) the microphone is muted, and
 (ii) the intonation of the speech signal indicates that the user is speaking into the microphone, and
 (iii) the proximity signal indicates that the user is speaking into the microphone.

7. A method comprising:
receiving:
 (i) a speech signal of a user of a microphone, and
 (ii) a proximity signal from a proximity sensor associated with the microphone; and
transmitting an alarm when:
 (i) an indication that the microphone is muted,
 (ii) the proximity signal indicates that the user is speaking into the microphone, and
 (iii) the intonation of the speech signal indicates that the user is speaking into the microphone.

8. The method of claim 7 wherein the alarm is audible.

9. The method of claim 7 wherein the alarm is visual.

10. The method of claim 7 further comprising un-muting the microphone.

11. The method of claim 7 further comprising:
extracting a level of intonation from the speech signal; and
comparing the level of intonation to a threshold;
wherein transmitting the alarm is also based on the level of intonation satisfying the threshold.

* * * * *